United States Patent
Mooney et al.

(10) Patent No.: US 9,648,488 B2
(45) Date of Patent: May 9, 2017

(54) METHODS AND SYSTEMS FOR PROVIDING USER INFORMATION IN TELECOMMUNICATIONS NETWORKS

(75) Inventors: Christopher F. Mooney, Livingston, NJ (US); Harvey Rubin, Morristown, NJ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 2165 days.

(21) Appl. No.: 12/289,298

(22) Filed: Oct. 24, 2008

(65) Prior Publication Data

US 2010/0103871 A1    Apr. 29, 2010

(51) Int. Cl.
| | |
|---|---|
| H04W 84/00 | (2009.01) |
| H04W 8/02 | (2009.01) |
| H04L 29/06 | (2006.01) |
| H04W 12/06 | (2009.01) |
| H04W 76/02 | (2009.01) |

(52) U.S. Cl.
CPC .......... H04W 8/02 (2013.01); H04L 63/0892 (2013.01); H04W 12/06 (2013.01); H04W 76/022 (2013.01)

(58) Field of Classification Search
CPC .. H04L 63/0892; H04W 12/06; H04W 76/022
USPC ............... 455/414.1, 456.5; 370/328, 342
See application file for complete search history.

(56) References Cited

U.S. PATENT DOCUMENTS

| | | | |
|---|---|---|---|
| 6,856,804 B1* | 2/2005 | Ciotta ...................... 455/435.1 |
| 7,263,076 B1* | 8/2007 | Leibovitz et al. ............ 370/310 |
| 7,366,136 B1* | 4/2008 | Kalbag .................. H04L 12/14 370/329 |
| 2004/0114553 A1* | 6/2004 | Jiang ...................... H04L 63/08 370/328 |
| 2004/0156340 A1* | 8/2004 | Madour ................ H04L 12/14 370/335 |
| 2006/0092904 A1* | 5/2006 | Carson ......................... 370/342 |
| 2006/0221051 A1* | 10/2006 | Flynt et al. ................... 345/156 |
| 2006/0262743 A1* | 11/2006 | Kalhan et al. ................ 370/328 |
| 2007/0127364 A1* | 6/2007 | Chaudry ................. H04L 67/14 370/216 |
| 2007/0195788 A1* | 8/2007 | Vasamsetti et al. ..... 370/395.21 |
| 2007/0208864 A1* | 9/2007 | Flynn ..................... H04L 63/02 709/227 |
| 2007/0226775 A1* | 9/2007 | Andreasen .......... H04L 63/0227 726/1 |
| 2008/0070555 A1* | 3/2008 | Sharma ..................... 455/414.1 |
| 2009/0028082 A1* | 1/2009 | Wynn ................. H04L 63/0428 370/310 |

(Continued)

*Primary Examiner* — Qun Shen (74) *Attorney, Agent, or Firm* — Harness, Dickey & Pierce, P.L.C.

(57) ABSTRACT

Example embodiments and methods are directed to providing and otherwise handling user information within telecommunications networks, including wireless telecommunications networks. Example embodiments may include wireless networks having a Correlation Data Records Store (CDRS) that may store and update all user data needed by applications and services operating in example networks. Example methods may provide for collection and handling in the CDRS of all user information relied upon by applications and services operating in wireless networks, so as to reduce resource consumption by such applications and services.

15 Claims, 5 Drawing Sheets

(56) References Cited

U.S. PATENT DOCUMENTS

2009/0070458 A1\* 3/2009 Fuse et al. .................... 709/224
2009/0085740 A1\* 4/2009 Klein et al. ................... 340/540

\* cited by examiner

METHODS AND SYSTEMS FOR PROVIDING USER INFORMATION IN TELECOMMUNICATIONS NETWORKS

BACKGROUND

Field

Example embodiments generally relate to systems and methods of telecommunications networks, applications and services associated therewith, and handling user information in such networks.

Description of Related Art

Figure 1:
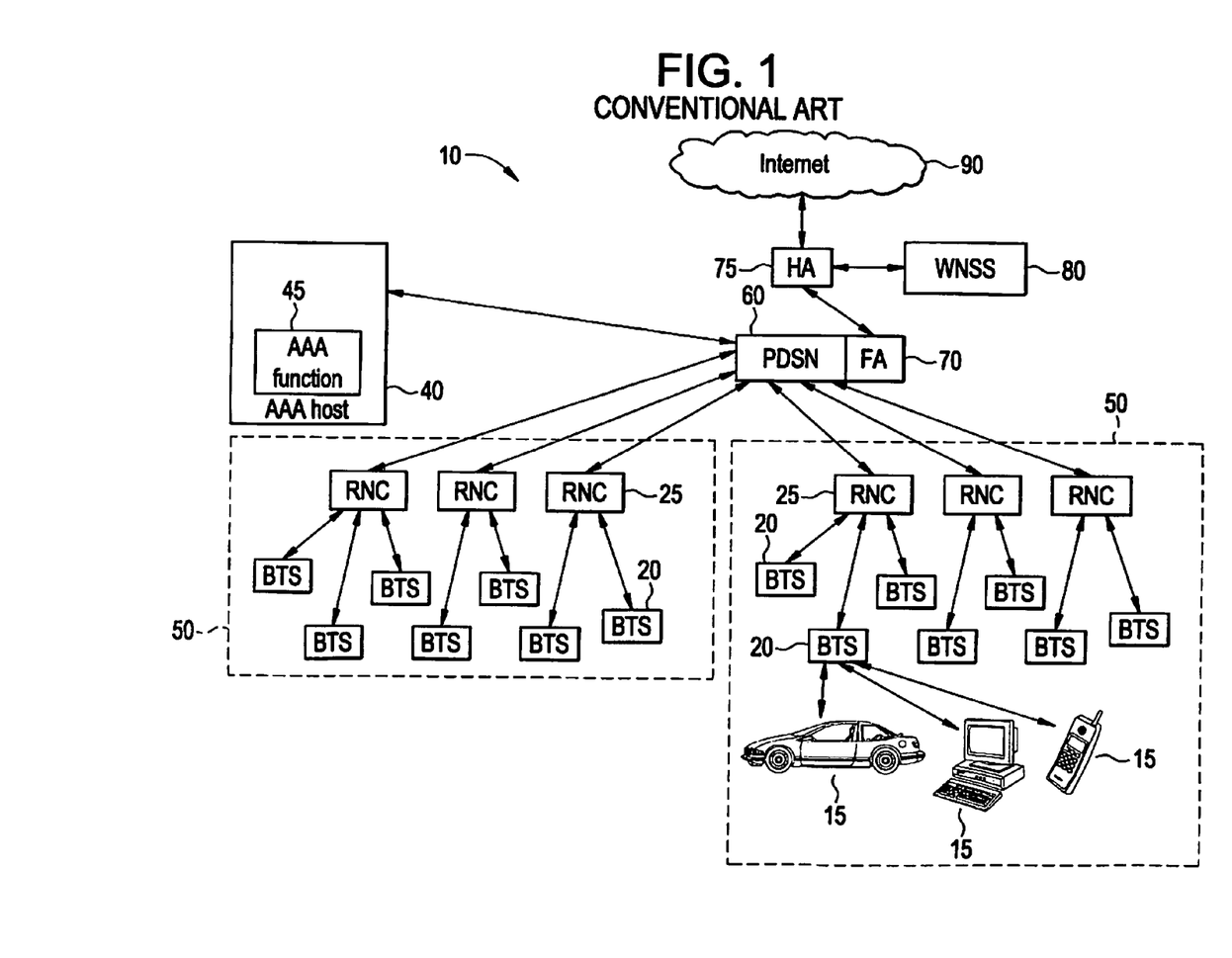
FIG. 1 is an illustration of a conventional wireless telecommunications network.

FIG. 1 is an illustration of a conventional wireless network 10 architecture. As shown in FIG. 1, individual users of the wireless network 10 may communicatively connect via a mobile station 15, such as a cellular telephone, to one or more base transceiver stations (BTS) 20. Data, including both control- and content-related data, may be sent and received between the BTS 20 and the mobile station 15. One or more BTSs 20 may be communicatively connected to a radio network controller (RNC) 25 in conventional wireless network 10. Typically, several BTSs 20 in a single geographic area may connect to a single RNC 25. The RNC 25 may transmit data from the BTS 20 further "up" the wireless network 10, that is, further removed from mobile stations 15, and may further enable passing-off mobile stations 15 between BTSs 20, as the mobile stations 15 move through particular geographic areas. RNCs 25 may further coordinate data transmission throughout the wireless network 10, including determining resource priority and transmission type between mobile stations 15 and BTSs 20.

The mobile stations 15, BTSs 20, and RNCs 25 may all be part of a Radio Access Network (RAN) 50. A telecommunications provider may operate one or more RANs 50 in providing telecommunications services in a variety of forms and areas. RAN 50 typically utilizes one or more communications standards uniformly throughout the RAN 50, including, for example Evolution-Data Optimized (EVDO), Code Division Multiple Access (CDMA), Universal Mobile Telecommunications System (UMTS), WiFi, etc., for the various forms of communications between each of its components. Components within a particular RAN 50 may store or utilize similar sets of user and other data, called "RAN data," to identify, track, and/or otherwise interact with users within the RAN 50.

RAN 50 may be communicatively connected to a Packet Data Serving Node (PDSN) 60 via RNCs 25. PDSN 60 may provide a variety of services to RAN 50, including internet access, operational data, and/or network applications to the RAN 50. PDSN 60 may connect through a Foreign Agent 70 and/or Home Agent 75, which may include conventional servers, routers, and/or other internet access devices, to the general internet 90. Through this connection, PDSN 60 may provide services conventionally considered internet access to mobile stations 15. PDSN 60 may further have access to a variety of wireless network services server (WNSS) 80, which may be provided to RAN 50 through PDSN 60. WNSS 80 may be one or more network provider-owned servers in a central or decentralized location(s) and may include, for example, hardware and/or software providing an internet browser, email management application, software downloading programs, etc. Depending on the application provided, WNSS 80 may use or enhance access to internet 90 for users of wireless network 10 through its applications.

PDSN 60 may be further connected to an Authentication, Authorization, and Accounting (AAA) host 40 conventionally found in EVDO networks, which may serve as a gatekeeper to the various applications and data available through PDSN 60. AAA host 40 may reside on one or more network provider-owned servers in a central location co-located with PDSN 60, a single remote location, or several remote and/or co-located locations. AAA host 40 may provide one or more AAA functions 45, which may be application-specific and govern user access to internet 90 and/or WNSS 80 through PDSN 60. For example, an AAA function 45 may authenticate a user mobile station 15 for internet access. Alternatively, for example, an AAA function 45 may limit user access to particular types of applications provided by WNSS 80, based on the user's subscription. Alternatively, for example, AAA function 45 may monitor individual usage of WNSS 80 and provide appropriate billing data for each user.

Conventionally, individual RNCs 25 may be assigned specific IP addresses for identification and interfacing through a tunneling protocol with internet 90 through PDSN 60, FA 70, and/or HA 75. Individual mobile stations 15 may receive internet data from individual RNCs 25 with which they are associated. The RNC 25 may access and use a number of different user identifiers stored in various locations, such as PSDN 60, BTSs 20, other RNCs 25, etc., to associate and further route the internet data to correct mobile stations 15. Such user identifiers used by the RNC 25 may include associated RAN data, such as mobile station serial numbers and user account identifiers, for example.

Through these identifiers and above-described connections to internet 90, WNSS 80, and/or AAA host 40, PDSN 60 may provide and coordinate data, services, and other information to RAN 50 and ultimately mobile stations 15 within a conventional wireless network 10.

SUMMARY

Example embodiments are directed to systems and methods of providing and otherwise handling user information within telecommunications networks, including wireless telecommunications networks. Example embodiments may include wireless networks, such as EVDO networks, for example, having a Correlation Data Records Store (CDRS) communicatively connected to the wireless network. CDRS in example networks may store and update all user data needed by applications and services operating in example networks, so as to reduce resource consumption by such applications and services.

Example methods may provide for collection and handling of all user information relied upon by applications and services operating in wireless networks, so as to reduce resource consumption by such applications and services.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Detailed illustrative embodiments of example embodiments are disclosed herein. However, specific structural and functional details disclosed herein are merely representative for purposes of describing example embodiments. The example embodiments may, however, be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially and concurrently or may sometimes be executed in the reverse order, depending upon the functionality/acts involved.

The inventors have recognized that conventional wireless telecommunications networks, such as the network 10 shown in FIG. 1, may consume undesirable amounts of network resources, including for example processing time and/or spectrum bandwidth, when providing network applications that rely on user identification and other RAN data within a particular RAN 50. For example, some applications offered in conventional wireless networks may rely upon IP addresses, BTS association, or other identification information of users of interest in order to locate those users and/or associate users with proper services. For example, a presence service that provides a wireless user with information of other wireless network users of interest, including, for example, status and/or location of the other network users of interest, may require constant data acquisition for each of the other users of interest in order to provide proper status and/or location information. In order to provide this data, a conventional wireless network 10 may need to do at least one of the following: 1) acquire data that is available for each user of interest in RAN 50 from each user of the RAN; 2) correlate the available data to an IP address for each user of interest; and/or 3) identify an access node for each user of interest based on the IP address, in order to determine a user characteristic such as location and/or busy status for each user of interest. Other example applications may require similar identification of users of interest and may further require paging and/or registration of users of interest to obtain additional information, such as communication mode.

For conventional wireless networks 10 having several users, each user having several users of interest within a presence service or other example application, the amount of data acquisition, data correlation, and/or user identification therebetween to maintain such a service may consume undesirable amounts of processing activities within a network 10. Further, for applications requiring user paging and/or registration in order to gather user identification and related information, undesirable amounts of network spectrum bandwidth may be consumed by the multiplicity of information-gathering pages and/or registrations required by example applications and services. Even further, as users move between different RANs 50 in a large network, user identification and related information present in a RAN 50 being left may not be present in a RAN 50 being entered, requiring complete recapture of the information for those example applications and services in the new RAN 50.

Figure 2:
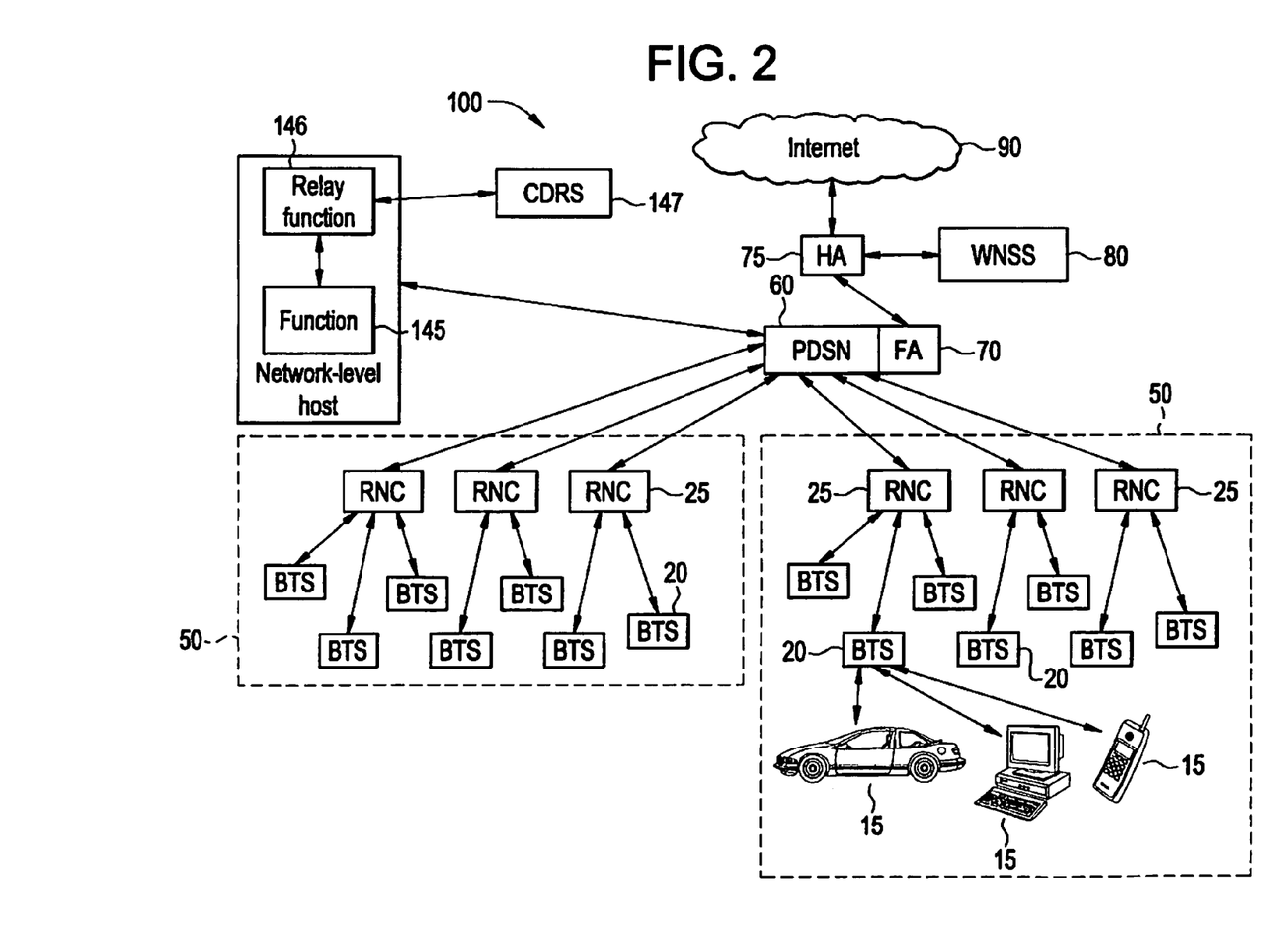
FIG. 2 is an illustration of an example embodiment wireless telecommunications network.

FIG. 2 is an illustration of an example embodiment wireless network 100 that may consume fewer resources than conventional networks while supporting a variety of example network applications and services providing user data among users, such as a presence or social networking service, for example. The network 100 shown in FIG. 2 may have several similar features to conventional wireless networks described in FIG. 1, with redundant numbering indicating similarity between those features. Descriptions of redundant features between FIG. 1 and FIG. 2 are omitted.

Example embodiment wireless network 100 may be any type of telecommunications network, operating on or compatible with any number of conventional communications standards and operating protocols, including, for example, EVDO, CDMA, WiFi, UMTA, WiMax, etc. Although various elements of FIG. 2 are shown connected by similar arrows, it is understood that any and various types of communicative connection may be indicated by such arrows between connected elements, including, for example, a wireless connection, a fiber-optic cable connection, etc., that permits the exchange of information therebetween.

Example embodiment wireless network 100 includes at least one Correlation Data Records Store (CDRS) 147 and at least one Relay Function 146, not typically found in conventional networks, communicatively connected to the rest of example embodiment network 100. CDRS 147 is capable of storing and processing information, and CDRS 147 may be a server or other electronic storage device with associated processors or the like. A single CDRS 147 may be used in example embodiments, or several co-located or separate CDRSs may be present in example embodiment network 100. CDRS 147 may be connected to example embodiment networks through, for example, a network-level host 140, although connection at other and/or several points is also possible, depending on the number and location of CDRSs 147.

A relay function 146 resides in example embodiment network 100 and communicatively connects and provides data between CDRS 147 and the rest of example embodiment network 100. Relay function 146 may be hardware including circuitry or a computer program or firmware or the like that provides data (discussed below) and proper connectivity between CDRS 147 and example embodiment networks. In the example embodiment network 100 of FIG. 2, relay function 146 may be a function within network-level host 140 and may reside as a filter alongside other network-level functions 145 in network-level host 140.

CDRS 147 stores and correlates RAN data including user information for all users required by example applications and services discussed above, including for example, presence services or buddy-list-type applications. For example, CDRS 147 may store and associate mobile station IP address, access node IP address, and/or mobile station serial number used with any RAN 50 for each user in example embodiment networks 100. CDRS 147 may reside "above" individual RANs 50, e.g., at the PDSN 60 level, in example networks 100 so as to provide uniform, correlated data for each user, regardless of which RAN 50, RNC 25, or BTS 20 a particular user is currently associated or roams between. In this way, CDRS 147 alone may provide example applications with all information for each relevant user, without applications individually gathering and processing the information for each user.

Example applications residing on WNSS 80 may access the required information through relay function 146 or directly with CDRS 147. Because each of the WNSS 80, CDRS 147, and relay function 146 may reside above the RAN 50 level, these components may be communicatively connected outside of the RAN 50 and not consume any RAN 50 resources, including RAN 50 spectrum bandwidth, in communicating the information that would otherwise be available only by querying RAN data from multiple sources. Further, mobile station movement between RANs 50 and mobile station status changes within RANs 50 may not be RAN-dependent because the CDRS 147 resides above and connects to each RAN 50.

Relay function 146 may further provide CDRS 147 with enough user data conventionally found in RAN data such that CDRS 147 may acquire and arrange any other RAN data for each user that may be supplied to and used by network applications and services. User data for each mobile station may change as users move through different geographic areas, power on/off mobile stations, connect to different applications on WNSS 80, change service plans, etc. Relay function 146 may be communicatively connected to or reside within an element of wireless network 100 that receives, via network messages or other communications, all this user data and changes thereto, in any form, across all RANs 50 within an example network 100. This network element may be, for example, a network-level host 140 or other server residing above the RAN 50 level in example network 100. Relay function 146 may pass all user data and changes within user data to CDRS 147. CDRS 147 may process and/or (re-)correlate the various user data and changes thereto in real time, and thus provide updated, complete user data for the entire wireless network 100 to dependent applications, without need for the applications to gather the information from the RAN 50 and potentially consume RAN 50 resources in doing so.

CDRS 147 and relay function 146 may be implemented in any type of example embodiment telecommunications network, as discussed above. While the following description relates to an example embodiment network that is an EVDO network, one skilled in the art will appreciate the implementation of example embodiment networks and methods in non-EVDO networks is possible without further inventive activity based on the descriptions herein.

EVDO Example Embodiment

Figure 3:
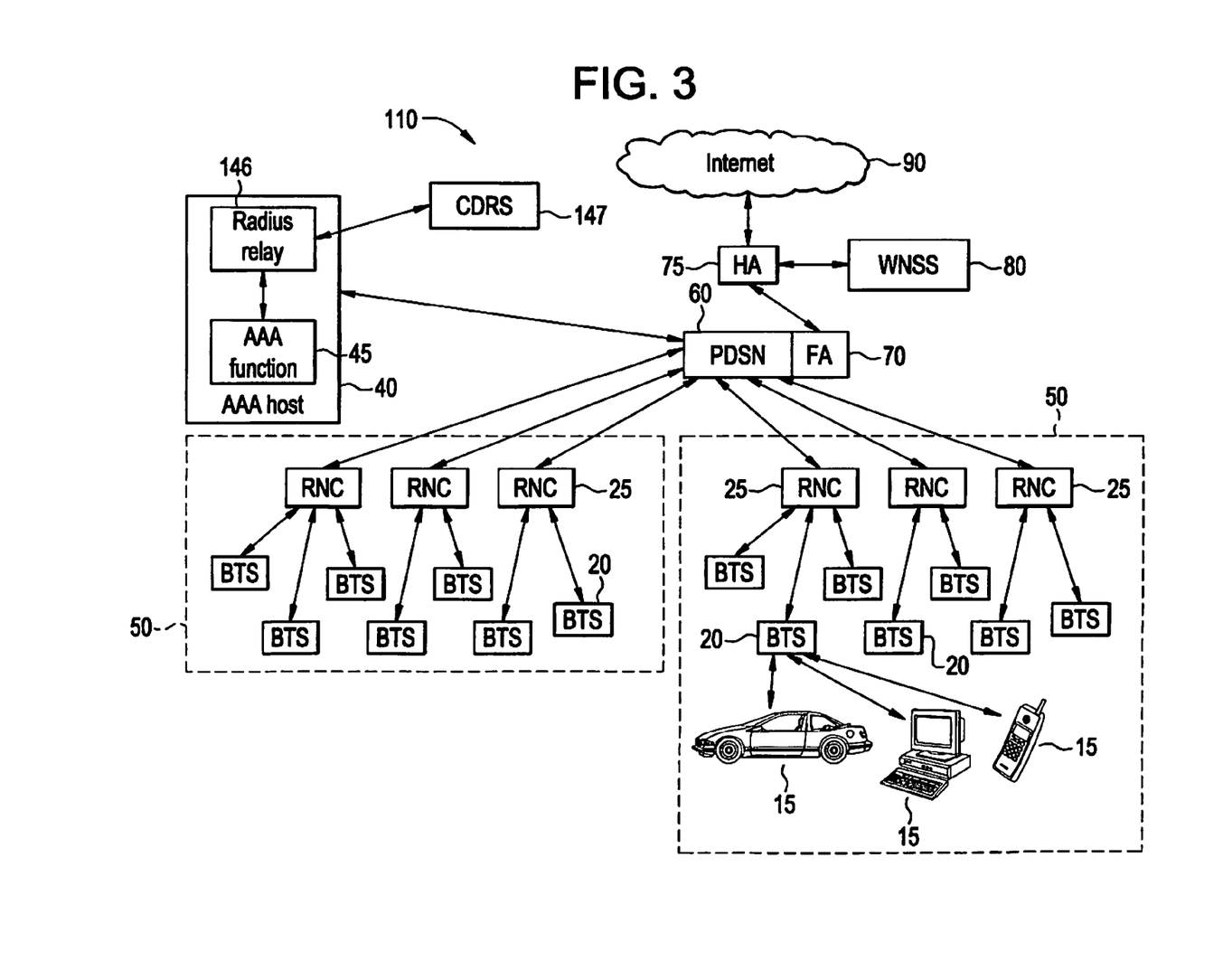
FIG. 3 is an illustration of an example embodiment EVDO network.

FIG. 3 is an illustration of an example embodiment network 110 that may be an EVDO network. The example embodiment network 110 shown in FIG. 3 may have several similar features to conventional wireless networks described in FIG. 1 or 2, with redundant numbering indicating similarity between those features. Descriptions of redundant features between FIGS. 1, 2, and 3 are omitted.

In an example embodiment EVDO network 110, network-level host 140 (shown in FIG. 2) may be an AAA host 40 as described in connection with FIG. 1, including AAA function 45. Relay function 146 (shown in FIG. 2) may be a RADIUS relay function interacting with RADIUS messages in an EVDO network, described below.

Example embodiment EVDO network 110 may use a RADIUS message to communicate data between PDSN 60 and AAA host 40. When a user establishes a data session through a mobile station 15, including, for example, initiating a call or application on mobile station 15 or powering on/off mobile station 15, depending on the services provided to the user, PDSN 60 generates a "RADIUS" start message. The RADIUS start message corresponds to the particular user establishing a data session and is forwarded to the AAA host 40 for authentication, authorization, or accounting between the user and the service. A full description of RADIUS message generation and behavior in EVDO networks is described in RFC 2866 (Request for Comments 2866, published by the Internet Engineering Task Force), the entire contents of which are herein incorporated by reference.

The RADIUS start message contains several pieces of information for a particular user, including an IP address assigned to the user, an IP address of an access node being used by the user, and several other pieces of RAN data to identify the user and mobile station 15 within a RAN 50 of example embodiment network 110. Table 1 below provides an accounting of relevant information contained in RADIUS start messages in an example embodiment EVDO network 110.

TABLE 1

RADIUS Start Message Elements

| Data Element | Field Name | RADIUS Type | Format | Meaning |
|---|---|---|---|---|
| NAI | User-Name | 1 | String | Network Address Identifier |
| Mobile Station IP Address | Framed-IP-Address | 8 | IP Address | Mobile Station IP Address |
| Serving PCF | 3GPP2-Serving-PCF | 26/9 | IP Address | IP address of access node for Mobile Station |
| BSID | 3GPP2-BSID | 26/10 | String | BTS Identifier |
| GREKey | 3GPP2-RP-Session-ID | 26/41 | Integer | Session ID |
| HWID | 3GPP2-ESN or 3GPP2-MEID | 26/52 or 26/116 | String | Serial Number or Mobile Station Identifier |
| MSID | Calling-Station-ID | 31 | String | IMSI or PsuedoIMSI flag |

The Radius start message may be generated by the PDSN 60 whenever a value of a field within the RADIUS start message changes, for example, if a user is passed off to a new BTS 20 within RAN 50, the user receives a new BSID, and a corresponding RADIUS start message with the new BSID (and potentially same or different values for other fields) is generated. Some fields, such as HWID, may not change for a particular mobile station 15 or user thereof.

Because each RADIUS start message contains complete RAN data and/or other useful user information and is forwarded to the AAA host 40 for proper administration, RADIUS relay function 146 may send all such information to CDRS 147 for storage, correlation, and use in network-wide applications. RADIUS relay function 146 may act as a filter for data reception on AAA host 40, indiscriminately forwarding each RADIUS start message to CDRS 147 before being received by AAA host 40. Alternatively, RADIUS relay function 146 may operate downstream in the AAA host, forwarding data after it is received and processed by the AAA host 40 to CDRS 147.

CDRS 147 may store and process each RADIUS start message received. In CDRS 147, each piece of data in the RELAY start message may be associated with a particular user of example embodiment network 110. CDRS 147 may further process and compare received messages to track relevant RAN data changes and provide updated, accurate information for each user. For example, using a field within the RADIUS start message that is unique for each user (or at least each mobile station 15), such as HWID listed above in Table 1, CDRS 147 may associate each RADIUS start message with a particular user and associate other fields, such as IP address, in the message, with the particular user. If a RADIUS start message is received at CDRS 147 having an HWID that is the same as a previously-received or stored message, CDRS 147 may update fields associated with the user associated with that HWID based on the information contained in the later start message. As such, when user status changes, RAN data may change and a RADIUS start message may be generated, permitting CDRS 147 to accurately track and provide current user status. As discussed above, CDRS 147 may include a processor and/or digital storage structures configured to receive, process, and/or store the user information from the RADIUS start messages in order to achieve this functionality.

PDSN 60 may also generate a RADIUS stop message when a user stops using a service or network resource, such as when a mobile station 15 is powered off or an internet connection times out, for example. RADIUS stop messages may contain similar or less information than a RADIUS start message. For example, a RADIUS stop message may contain only a stop code indicating an internet connection has timed out or been closed. PDSN 60 may forward the RADIUS stop message to the AAA host 40, in order to close out accounting or authentication for the user, who may have powered off or left the service area, for example. As with the start messages, RADIUS relay function 146 may forward the stop message to CDRS 147, which may in turn update data associated with the user associated with the stop message. For example, if the RADIUS stop message indicates that a particular IP address has timed-out from lack of use, CDRS 147 may change the data associated with the user last associated with the particular IP address, such as clearing any IP address fields for that user.

Applications or services residing on the WNSS 80 or individual mobile stations 15 may query the CDRS 147 for RAN data or more specific information of particular users, based on the type of application, without accessing the RAN 50. For example, a presence service may query CDRS 147 for the BSID of a user known only by HWID and/or IP address, for example, in order to provide powered on status and location of that user to other users using the presence service. Alternatively, CDRS 147 may include appropriate processors and programming in order to forward similar information for particular users to active applications in the WNSS 80 at regular intervals for the same effect. Information exchanged in this manner may pass through RADIUS relay function 146 or may be directly passed to the CDRS 147, for example.

In this way, applications or services residing on WNSS 80 may gather less data from RAN 50 or mobile stations 15 and consume less spectrum bandwidth within RAN 50, because all user data exchange may occur above the RAN 50 level. Similarly, because all relevant user data may reside in a single CDRS 147, applications and services may not require several queries to different data sources and subsequent data processing and compiling from the disparate sources. This may result in less resource usage by applications and services, such as processor usage. Even if mobile stations 15 themselves request user data, because all relevant data may be stored in a single CDRS 147, fewer requests and associated spectrum bandwidth consumption within RAN 50 may be required in example embodiment networks.

Example Methods

Example embodiment telecommunications networks having been described, example methods are now described with reference to the structures and signals discussed in above example embodiments. Although example methods may use terminology described in the above example embodiments, it is understood that example methods may be performed independent of the above example embodiments.

Figure 4:
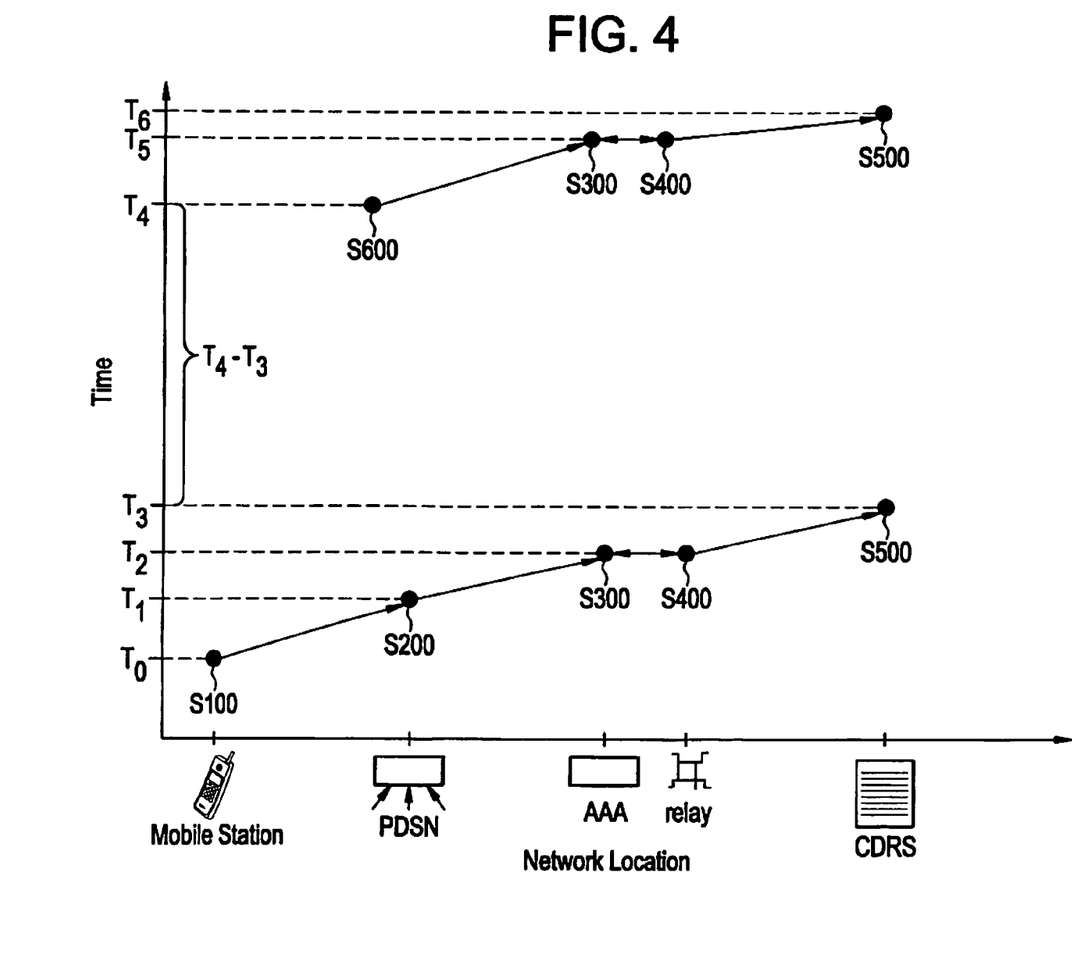
FIG. 4 is a time-based flow chart illustrating example methods of providing user data.

Example methods are directed to aggregation, storage, and handling of user information in telecommunications networks. FIG. 4 is a time-dependent flow chart illustrating example methods. As shown in FIG. 4, at time $T_0$, in step S100, a mobile station establishes a data connection within a telecommunications network. At time $T_1$, in step S200, a PSDN generates a network-level identifying message, such as a RADIUS start message, based on the mobile station activity in step S100. At time $T_2$, in step S300, a network-level server, such as an AAA host, or other element may receive the identifying message. Reception of the identifying message in step S300 is shown merely for temporal reference and need not actually occur in example methods. At the same time $T_2$, or nearly contemporaneous before or after, in step S400, a relay function forwards the identifying message to a CDRS. At time $T_3$, in step S500 the CDRS receives the identifying message and updates, correlates, and/or otherwise handles the user data as described below with reference to FIG. 5.

At time $T_4$, mobile stations may change user data within the RAN, or a timeout interval, $T_4$-$T_3$, for a particular IP address may elapse, resulting in the generation of either a termination message, such as a RADIUS stop message, or another identifying message including the new data in step S600. The message generated in step S600 is again received and forwarded in step S300 and step S400 at time $T_5$, and in step S500 the CDRS again updates, correlates, and/or otherwise handles the user data contained in the newly generated message at $T_6$.

Times $T_0$-$T_6$ in FIG. 4 are separated merely for illustration and are not to scale; for example, intervals between times may be nonexistent and/or substantially non-uniform, depending on network parameters and user activities. Similarly, although various components in FIG. 4 are shown at different network locations for clarity among the various components, any components may be co-located or otherwise communicatively connected.

Figure 5:
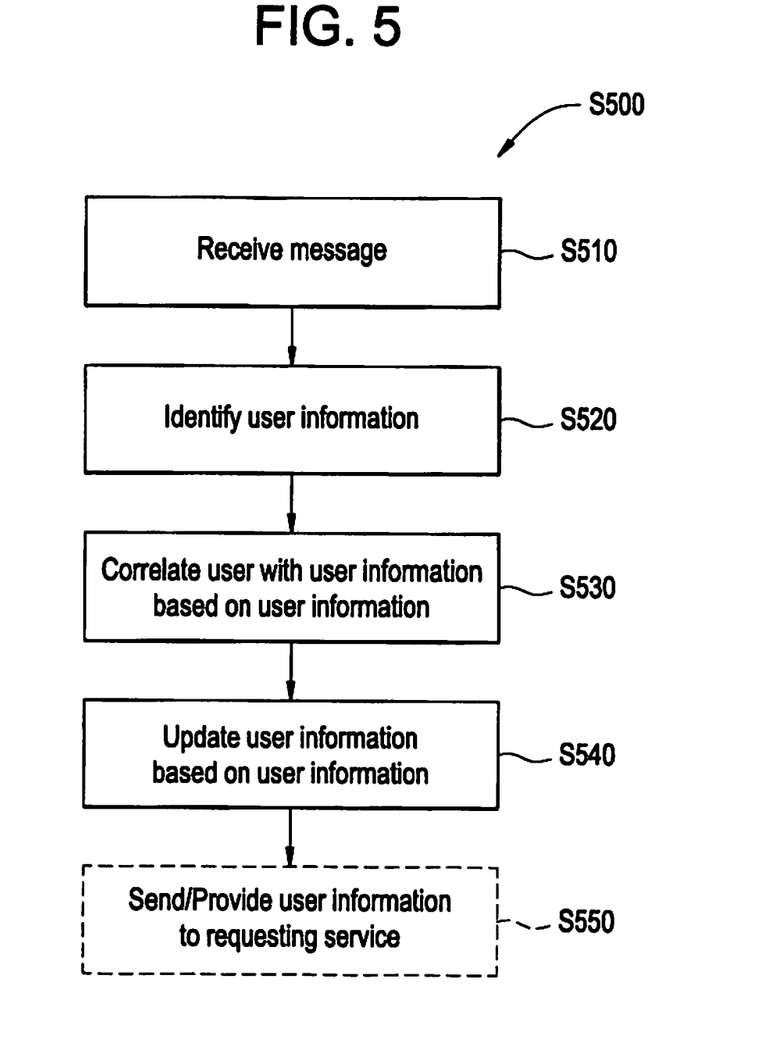
FIG. 5 is a flow chart illustrating an example data handling step of example methods.

FIG. 5 is a flow chart of an example method illustrating example step S500 in detail. As shown in FIG. 5, within step S500, the identifying message generated in example methods may be received by the CDRS in sub-step S510. In sub-step S520, any user information within the identifying message, including, for example, IP address, hardware serial number, session number, and/or other user information, may be extracted and identified. In sub-step S530, the user information may be correlated with a particular user based on the user information. For example, if a hardware serial number or IP address within the identifying message correlates with a particular user, all user information within the identifying message may be associated with that user in sub-step S530. In sub-step S540, the associated user information may be updated, or stored, for that user, replacing any previous user information associated with that user.

In sub-step S550, the user information may optionally be provided to any services requesting the information. The user information may be provided in sub-step S550 by, for example, individual services requesting or querying the CDRS for the information. Alternatively, services may request the CDRS to constantly transmit certain user information to the services as user information changes as described above. In any case, providing the information in sub-step S550 may occur increasingly or wholly outside of a RAN, thereby reducing resource consumption therein.

In this way, example methods may permit accurate, real-time user data across an entire telecommunications network to be available in a single location outside of the RAN, which may reduce the amount of network resources consumed by applications and services operating in the network.

Example embodiments and methods thus being described, it will be appreciated by one skilled in the art that example embodiments may be varied through routine experimentation and without further inventive activity. Variations are not to be regarded as departure from the spirit and scope of the exemplary embodiments, and all such modifications as would be obvious to one skilled in the art are intended to be included within the scope of the following claims.

What is claimed is:

1. A telecommunications network comprising:
   at least one correlation data records store (CDRS) communicatively connected to a packet data serving node (PDSN) outside at least one radio area networks (RAN),
   the CDRS configured to store and provide user data for plural users connected in the at least one RAN such that, for each user among the plural users,
      the user data of the user includes an IP address of the user and a base station ID (BSID) associated with the user,
      the CDRS is configured to receive the user data of the user from the PDSN via a network level host communicatively connected between the PDSN and CDRS, and
      the CDRS is configured to correlate the user data of the user with the user,
   wherein the first user data of first user, among the plural users, includes a first user IP address, a first access node IP address, a first base transceiver station identifier, a first mobile station serial number, and a first powered-on status.

2. The network of claim 1, further comprising:
   a wireless network services server (WNSS) providing at least one service to the network, the WNSS being communicatively connected to the PDSN.

3. The network of claim 2, wherein the CDRS provides first user data of a first user, among the plural users, to the at least one service.

4. The network of claim 3, wherein the at least one service is a presence service configured to provide user location information.

5. The network of claim 1,
   wherein the CDRS is configured to receive, from the PDSN, network-level messages containing first user data of a first user, among the plural users, and
   wherein the CDRS is configured to store the first user data from the network-level messages.

6. The network of claim 1, wherein the network is an Evolution-Data Optimized (EVDO) network.

7. A method of handling user data in a telecommunications network, the method comprising:
   receiving a network-level message when a user establishes a data session in the network, the network-level message including user data, the network-level message being received at a correlation data records store (CDRS) from a packet data server node via a network-level server, the CDRS being configured to store and provide user data for plural users connected to the telecommunications network;
   correlating the user data included in the network-level message with a first user, among the plural users, based on the user data included in the network-level message; and
   storing the correlated user data in the CDRS,
   the correlated user data including an IP address of the first user and a base station ID (BSID) associated with the first user,
   wherein the first user data of first user, among the plural users, includes a first user IP address, a first access node IP address, a first base transceiver station identifier, a first mobile station serial number, and a first powered-on status.

8. The method of claim 7, further comprising:
   providing the user data included in the network-level message to a service operating on the network.

9. The method of claim 8, wherein the service is a presence service configured to provide user location information.

10. The method of claim 7, wherein the storing replaces user information stored from a previous network-wide message.

11. The method of claim 10, further comprising:
    receiving a second network-level message from the packet data server node when a user terminates a data session in the network or a time-out period elapses, the second network-level message including user data.

12. The method of claim 7, wherein the network is an Evolution-Data Optimized (EVDO) network, and wherein the network-level message is a RADIUS start message.

13. The method of claim 12, wherein the RADIUS start message is received at the CDRS from a RADIUS relay function, the RADIUS relay function being included in an authorization, authentication, and accounting host.

14. The network of claim 1, further comprising:
    the network-level host.

15. The network of claim 14, further comprising:
the PDSN.

* * * * *